Patented Aug. 18, 1953

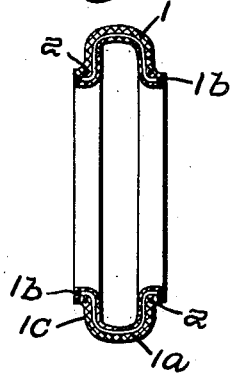

2,648,958

UNITED STATES PATENT OFFICE 2,648,958

FLEXIBLE COUPLING

Karl Schlotmann, Massen, near Unna, Germany, assignor to Maschinenfabrik Stromag-G. m. b. H., Unna, Germany Application December 19, 1949, Serial No. 133,729
In Germany December 28, 1948

2 Claims. (Cl. 64—13)

This invention refers to flexible couplings for transmitting power from one shaft to another shaft.

One object of this invention is to provide a coupling adapted to be flexed in any direction, which coupling is more wear-resistant and more reliable in operation and has a longer life than the flexible couplings of this type which were known heretofore.

Another object of this invention is to provide a coupling comprising a torsion member of vulcanized rubber or similarly resilient material adapted to be flexed in any direction wherein the torsion member is relieved of any stresses except pressure at certain areas used for attachment thereof to the driving and driven member of the coupling.

Another object of this invention is to provide a coupling comprising a torsion member adapted to be flexed in any direction and securely attached to the driving and the driven member of the coupling in such a way as to minimize wear of the torsion member at the region of attachment.

Another object of this invention is to provide a coupling comprising a torsion member adapted to be flexed in any direction and provided with means affording added strength where the stresses resulting from attaching the torsion member to the driving and the driven member of the coupling tend to be large.

These and other objects and advantages of the present invention will be more fully apparent from the particular description thereof, in conjunction with the appended drawing which shows, in preferred forms, two structures embodying the invention.

In the drawings:

Fig. 1 is a cross-section of a laminated torsion member consisting mainly of vulcanized rubber and intended for use in the structure of Figs. 3 and 4 as well as in the structure of Figs. 5 and 6;

Fig. 2 is a side elevation of the torsion member of Fig. 1;

Fig. 3 is a side view, partly in vertical section, of a complete flexible coupling;

Fig. 4 is a side elevation of the structure shown in Fig. 3;

Fig. 5 is a side view, partly in vertical section, of a modification of the structure of Fig. 3 including means for transmitting a braking force to one of the pair of shafts which are flexibly coupled, and Fig. 6 is a side elevation of the structure shown in Fig. 5, as seen from the left of Fig. 5.

Referring now to Fig. 1, the torsion member 1 shown therein is generally similar to a rubber tire for motor vehicles i. e. it is substantially annular in shape and arcuate in cross-section. Torsion member 1 is formed by a rubber laminate and comprises an insert 1a of fibrous material, meshed wire or the like, which is sandwiched between two outer sheets of vulcanized rubber. Torsion member 1 is provided with reinforced rims 1b which project in a direction axially of torsion member 1 and form integral parts thereof. As clearly shown in Fig. 1 insert 1a has edges bent about 90 degrees out of the general plane thereof and extending into rims 1b. A circular concentric reinforcement insert 2 of fibrous material or wire is associated with each rim 1b. The torsion member 1 is preferably provided with a slot 8, as shown in Fig. 2. Slot 8 may either be radial or skew.

Referring now to Figs. 3 and 4, shaft 4 supports a flanged coupling element 3 keyed to it by means of key 3a. Shaft 7 supports a flanged coupling element 3' keyed to it by means of key 7a. The torsion member 1 which is flexible in any direction couples the two coupling elements 3 and 3'. As clearly shown in Fig. 3 the annular or toroidal torsion member 1 extends along and overlaps the periphery of coupling elements 3 and 3'. Each coupling element is provided at, or adajacent to, the periphery thereof with a shoulder substantially L-shaped in cross-section for receiving torsion member 1. The cross-section of torsion member 1 is substantially U-shaped and the torsion member encloses between the shank portions 1c thereof the peripheral portions of coupling elements 3 and 3'. The rims 1b of the torsion member project substantially at right angles from the shank portions 1c thereof. The structure of Figs. 3 and 4 is further provided with a pair of clamping rings 6 angular or substantially L-shaped in cross-section clamping torsion member 1 to coupling elements 3 and 3'. The rims 1b of torsion member 1 and the clamping rings 6 provide radially inner clamping zones where torsion member 1 is subjected to pressure only and is free from any other stresses, in particular the torsional stresses involved in transmitting a torque from one shaft and coupling element to the other coupling element and shaft. Each clamping ring 6 is secured by a set of screws 5 to coupling elements 3 and 3', respectively, and is provided with a radially inner clamping surface 13 and a concentric, radially outer spaced clamping surface 14. The former is adapted to engage and engages the rims or rim portions 1b of torsion member 1, while the latter is adapted to engage and engages the shank portions 1c of torsion member 1. Between each radially clamping surface or area 13 and each radially outer clamping surface or area 14 a circular zone is defined where torsion member 1 is less compressed by each of said pair of clamping rings than at each said clamping area 13 and each said clamping area 14. Stresses involved in the transmission of power between spaced shafts 4 and 7 are sealed-off at the radially outer clamping zones 14 and hence not transmitted to the radially inner clamping zones 13. It will be noted that the radially inner clamping areas 13 as well as the radially outer clamping areas are backed-up by coupling elements 3 and 3'. The annular reinforcement inserts 2 are situated in that portion of torsion member 1 which is subjected to no stresses other than clamping pressure. The radially inner clamping surface 13 of torsion member 1 is situated immediately adjacent and is arranged coaxially with respect to the annular or circular reinforcement insert 2. The diameter of the clamping rings 6 is smaller than the largest diameter of torsion member 1 and the latter is thus always exposed to view and can hence readily be inspected. Each clamping ring 6 is provided with a radially outer adjusting surface 9.

The coupling elements 3 and 3' are each provided with a dog 10 and 11, respectively. These dogs 10, 11 are adapted to engage upon a predetermined relative rotation of shafts 4 and 7 and coupling elements 3 and 3' before the limited amount of torsion to which torsion member 1 may safely be subjected has been exceeded. The maximum angle of permissible relative rotation of coupling elements 3 and 3' has been indicated in Fig. 4 by the reference sign $a$. When this angle is reached, dogs 10 and 11 engage, thus providing for positive transmission of power from one shaft to the other and relieving torsion member 1 of additional stresses.

The slot 8 in torsion member 1 permits mounting and replacement of the latter with the flanged coupling elements 3 and 3' mounted on and keyed to shafts 4 and 7.

In Figs. 5 and 6 the same reference numbers as in Figs. 3 and 4 have been applied to like parts. Therefore Figs. 5 and 6 need to be described only inasmuch as the structure shown therein differs from the structure shown in Figs. 3 and 4. According to Figs. 5 and 6 one of the clamping rings 6 is provided with a hub 14'. Hub 14' is mounted on and keyed by means of a key 15 to the coupling element 3. The clamping ring 6 which is provided with the hub 14' is also provided with means defining a cylindrical surface 12 adapted to form a brake drum. Because hub 14' is keyed to coupling element 3, screws 5 need but to exert the required clamping pressure for torsion element 1 but need not to transmit the braking force from surface 12 to shaft 3. It is apparent from Fig. 5 that the cylindrical surface 12 extends in axial direction along only a portion of the width of the flexible torque-transmitting torsion member, thus enabling relatively free access of ambient air to said torsion member.

It will be apparent from the foregoing and particularly from Fig. 2 and the context thereof that the slot 8 in the torsion member 1 is an important feature since it enables mounting of the torsion member 1 on the narrowly spaced coupling elements 3, 3' with said coupling elements in their narrowly spaced positions. It will also be apparent from the foregoing that the coupling elements are provided each with a substantially L-shaped shoulder for receiving the substantially L-shaped cross-section edge portions of the torsion member 1. The latter portions project from the above shoulder portions in a direction longitudinally of shafts 4 and 7. It is at these projecting portions 1b that the torsion member 1 is engaged by the clamping rings 6 and 13 in addition to being engaged by said rings along portions of the surface thereof remote from said edge portions.

It will be understood that by illustrating herein two preferred embodiments of my invention, I do not intend to limit my invention thereto. It will be apparent to those skilled in the art that various changes and modifications may be made without departing from the spirit of the invention or from the scope of the appended claims.

It is claimed and desired to secure by Letters Patent:

1. A flexible coupling comprising a pair of spaced shafts, a pair of flanged coupling elements each secured to one of said pair of shafts, each of said pair of coupling elements having a shoulder at the periphery thereof substantially L-shaped in cross-section, a flexible torsion member coupling said pair of coupling elements, said torsion member comprising a main body and a pair of internally reinforced edge portions each resting in said shoulder of one of said pair of coupling elements and each projecting at a substantially right angle from the general plane of said torsion member, and a pair of clamping rings substantially L-shaped in cross-section securing said torsion member to each of said pair of coupling elements, each of said pair of clamping rings having a radially inner clamping surface engaging one of said pair of edge portions of said torsion member along a first circular clamping area, and each of said pair of clamping rings having a radially outer clamping surface radially spaced from said radially inner clamping surface and engaging said torsion member along a second clamping area arranged coaxially with respect to said first clamping area, a circular zone where said torsion member is less compressed by each of said pair of clamping rings than at each said first clamping area and each said second clamping area being formed between each said first clamping area and each said second clamping area.

2. A flexible coupling comprising a pair of spaced shafts, a pair of flanged coupling elements each secured to one of said pair of shafts, a torsion member flexible in any direction for coupling said coupling elements, said torsion member consisting of a reinforced sheet material substantially in the shape of a toroid of substantially U-shaped cross-section enclosing between the shank portions thereof the peripheral portions of said pair of coupling elements, said torsion member comprising a pair of rims forming integral parts thereof each projecting from but one side of each said shank portions of said torsion member away from the general plane thereof, and a pair of clamping rings substantially L-shaped in cross-section securing said torsion member to each of said pair of coupling elements, each of said pair of clamping rings having a radially inner clamping surface engaging one of said pair of rims of said torsion member along a first circular clamping area, and each of said pair of clamping rings having a radially outer clamping surface radially spaced from said radially inner clamping surface and engaging said torsion member along a second circular clamping area arranged coaxially with respect to said first clamping area, each said first clamping area and each said second clamping area being backed-up by one of said pair of coupling elements, a circular zone where said torsion member is compressed to a lesser degree by each of said pair of clamping rings than at each said first clamping area and each said second clamping area being formed between each said first clamping area and each said second clamping area.

KARL SCHLOTMANN.

References Cited in the file of this patent

UNITED STATES PATENTS

| Number | Name | Date |
| --- | --- | --- |
| 1,656,715 | Weiland | Jan. 17, 1928 |

FOREIGN PATENTS

| Number | Country | Date |
| --- | --- | --- |
| 258,333 | Great Britain | Sept. 16, 1926 |
| 852,098 | France | Jan. 23, 1940 |
| 643,172 | Germany | Mar. 30, 1937 |
| 660,305 | Germany | May 23, 1938 |